US008437285B2

(12) United States Patent
Jokimies et al.

(10) Patent No.: US 8,437,285 B2
(45) Date of Patent: May 7, 2013

(54) WIRELESS DEVICE AND BASE STATIONS AND METHODS OF OPERATING

(75) Inventors: Matti Kullervo Jokimies, Salo (FI); Gilles Charbit, Farnborough (GB)

(73) Assignee: Renesas Mobil Corporation, Tokyo (JP)

( * ) Notice: Subject to any disclaimer, the term of this patent is extended or adjusted under 35 U.S.C. 154(b) by 0 days.

(21) Appl. No.: 13/427,553

(22) Filed: Mar. 22, 2012

(65) Prior Publication Data

US 2013/0044661 A1 Feb. 21, 2013

Related U.S. Application Data

(63) Continuation of application No. 13/210,616, filed on Aug. 16, 2011.

(30) Foreign Application Priority Data

Aug. 16, 2011 (GB) .................................. 1114080.3

(51) Int. Cl.
*G08C 17/00* (2006.01)
*H04B 7/005* (2006.01)
*H04B 1/44* (2006.01)

(52) U.S. Cl.
USPC .............................. 370/311; 370/278; 455/78

(58) Field of Classification Search .................. 370/278, 370/310–350; 455/78, 458
See application file for complete search history.

(56) References Cited

U.S. PATENT DOCUMENTS

| | | | |
|---|---|---|---|
| 7,306,557 B2* | 12/2007 | Lagendijk et al. ................. | 600/7 |
| 7,761,122 B2* | 7/2010 | HomChaudhuri ............ | 455/574 |
| 7,916,675 B2* | 3/2011 | Dalsgaard et al. ............ | 370/311 |
| 8,085,694 B2* | 12/2011 | Wu et al. ........................ | 370/305 |
| 8,243,647 B2* | 8/2012 | Ishii et al. ...................... | 370/315 |
| 8,312,142 B2* | 11/2012 | Rinne et al. ................... | 709/226 |

(Continued)

FOREIGN PATENT DOCUMENTS

| | | |
|---|---|---|
| EP | 2 362 697 A1 | 8/2011 |
| WO | WO 2007/052141 A1 | 5/2007 |
| WO | WO 2009/099931 A1 | 8/2009 |
| WO | WO 2011/087233 A2 | 7/2011 |

OTHER PUBLICATIONS

UK IPO Search Report under Section 17 dated Dec. 14, 2011 issued in a related British Application No. GB 1114080.3 (4 pages).

(Continued)

*Primary Examiner* — Warner Wong
(74) *Attorney, Agent, or Firm* — Lucas & Mercanti LLP; Robert P. Michal

(57) ABSTRACT

In one aspect, a wireless device sends a synchronization group identifier to a network control apparatus identifying a synchronization group of wireless devices. If the wireless device is notified that no other devices of the synchronization group are connected to the control apparatus, the wireless device transmits a timing reference to and agrees an extended discontinuous reception time period with the control apparatus. Otherwise, the wireless device receives a timing reference and an extended discontinuous reception time period from the control apparatus. The wireless device periodically enters an idle state and powers up for reception in accordance with at least the timing reference and the extended discontinuous reception time period. In another aspect, plural base stations each use a common timing reference and a common extended discontinuous reception time period in controlling the operation of extended discontinuous reception by a synchronization group of wireless devices.

13 Claims, 6 Drawing Sheets

U.S. PATENT DOCUMENTS

| | | | |
|---|---|---|---|
| 2004/0087320 A1* | 5/2004 | Kim et al. | 455/458 |
| 2008/0101268 A1* | 5/2008 | Sammour et al. | 370/311 |
| 2008/0186892 A1* | 8/2008 | Damnjanovic | 370/311 |
| 2008/0220796 A1* | 9/2008 | Kohlmann et al. | 455/458 |
| 2009/0040955 A1* | 2/2009 | Jung et al. | 370/311 |
| 2010/0022257 A1* | 1/2010 | Koskela | 455/458 |
| 2010/0130237 A1* | 5/2010 | Kitazoe et al. | 455/458 |
| 2010/0144299 A1* | 6/2010 | Ren | 455/226.1 |
| 2010/0208660 A1* | 8/2010 | Ji | 370/328 |
| 2011/0021215 A1* | 1/2011 | Iwamura et al. | 455/458 |
| 2011/0170420 A1* | 7/2011 | Xi et al. | 370/241 |
| 2012/0071177 A1* | 3/2012 | Hung et al. | 455/458 |
| 2012/0120843 A1* | 5/2012 | Anderson et al. | 370/253 |
| 2012/0122495 A1* | 5/2012 | Weng et al. | 455/458 |
| 2012/0207069 A1* | 8/2012 | Xu et al. | 370/311 |
| 2012/0275366 A1* | 11/2012 | Anderson et al. | 370/311 |

OTHER PUBLICATIONS

3GPP TSG SA WG2 Meeting #85, Nokia Siemens Networks, Nokia, Ericsson, ST-Ericsson, Interdigital, "Extended Paging Cycles", (May 16-20, 2011), TD S2-112592, (3 pages).

3GPP TS 36.331 V10.2.0 (Jun. 2011), Technical Specification, 3rd Generation Partnership Project; Technical Specification Group Radio Access Network; Evolved Universal Terrestrial Radio Access (E-UTRA); Radio Resource Control (RRC); Protocol Specification (Release 10), (294 pages).

\* cited by examiner

WIRELESS DEVICE AND BASE STATIONS AND METHODS OF OPERATING

CROSS-REFERENCE TO RELATED APPLICATION

This is a continuation of U.S. patent application Ser. No. 13/210,616 filed Aug. 16, 2011, which in turn claims the benefit under 35 U.S.C. §119 of British Patent Application No. 1114080.3 filed Aug. 16, 2011, the entire disclosure of each of which is incorporated herein by reference.

TECHNICAL FIELD

The present invention relates to a method of and a processing system for operating a wireless device, and to a method of and apparatus for operating plural base stations.

BACKGROUND

Machine-to-machine (M2M) communications, also referred to as machine-type communications (MTC) in 3GPP (3rd Generation Partnership Project), is a type of communication that is expected to expand, potentially rapidly, in the near future. With MTC, machines may locally or remotely communicate directly with one another and may be employed for various applications including for example for smart homes, security and surveillance, smart/remote metering, fleet management, remote healthcare, access network operation management, manufacturing automation, etc.

Wireless devices often make use of so-called discontinuous reception or DRX in which the device is only periodically receptive to incoming control signals from the network (including in particular paging messages). The device at least partially powers down when not expecting to receive incoming control signals, for example by powering down a radio system of the device, which saves power and therefore extends battery life in battery-operated devices. The term "radio system" is typically used in this specification to refer to one or more of the radio front end, antenna(s), and relevant processing circuitry and software required for transmission/reception in a wireless device. In at least some circumstances, the term "radio system" is used to refer to all of such components. The time period of this "ordinary" DRX, i.e. the length of time that the device is (at least partially) powered down or "asleep" between reception periods, is typically quite short, of the order of a few seconds (say 10 seconds or so) at most. As a particular example, the maximum specified default paging cycle value in radio frames in Technical Specification 36.331 in 3GPP E-UTRAN (Evolved Universal Terrestrial Radio Access Network) is 2.56 s, and can be configured for the RRC_IDLE and RRC_CONNECTED states, where RRC_is Radio Resource Control. However, shorter time periods may be used, specific examples including 320, 640 and 1280 milliseconds.

These relatively short DRX time periods are well suited for use by personal wireless devices (including for example mobile devices including mobile or cell phones (including so-called "smart phones"), personal digital assistants, pagers, tablet and laptop computers, content-consumption or generation devices (for music and/or video for example), data cards, USB dongles, etc., as well as fixed or more static devices, such as personal computers, game consoles and other generally static entertainment devices). Users of such devices will typically want to be made aware rapidly of an incoming voice call, or SMS text message, or email or the like.

However, for machine-type communications (MTC) in machine-to-machine (M2M) communications in particular, a much longer "extended" DRX time period has been proposed, largely to keep down the frequency of paging messages and other system signals being sent and therefore to keep down the general volume of network traffic, and also to keep down power consumption, which again is important for battery-powered devices. The extended time period may be at least several minutes, but is typically an hour or several hours, or even 24 hours or even several days. As can be seen, the extended DRX time period is likely to be at least 1000 times longer than an ordinary DRX time period. For a specific example relevant to 3GPP, see the contribution 52-112592 in 3GPP TSG SA WG2 (Technical Specification Groups Service and System Aspects Working Group 2). However, the use of an extended DRX time period gives rise to a number of different problems.

SUMMARY

According to a first aspect of the present invention, there is provided a method of operating a wireless device, the method comprising: a wireless device sending a synchronisation group identifier to a control apparatus of a wireless network, the synchronisation group identifier identifying a synchronisation group of wireless devices to which the wireless device belongs; if the wireless device is notified that no other devices of said synchronisation group are connected to a said control apparatus, the wireless device transmitting a timing reference to a said control apparatus and agreeing an extended discontinuous reception time period with a said control apparatus, said extended discontinuous reception time period being longer than an ordinary discontinuous reception time period used by the device during ordinary discontinuous reception; else, the wireless device receiving a timing reference and an extended discontinuous reception time period from a said control apparatus; the wireless device periodically entering an idle state and powering up for reception in accordance with at least the timing reference and the extended discontinuous reception time period.

In examples of this aspect, all wireless devices in a synchronisation group can in essence be provided with the same or a corresponding timing reference and extended discontinuous reception time period so that particular activities of the wireless devices in the synchronisation group can be coordinated and synchronised. As will be discussed further below, in specific examples, this allows the chances of interference between wireless devices and congestion of the wireless network to be reduced. The timing reference that is used is one that is transmitted to a network control apparatus by the first wireless device of a synchronisation group connected to the control apparatus, and similarly the extended discontinuous reception time period is one that is negotiated between that device and the control apparatus. A synchronisation group as used herein refers to a group of wireless devices or user equipment (UEs) forming a capillary network or a plurality of capillary networks whose transmissions and receptions are coordinated, i.e. the UEs are transmitting and receiving in synchronisation with one another (though not necessarily simultaneously), according to some common, shared time basis following some synchronisation procedure between the UEs via the main cellular network or via some peer-to-peer transmission supported by the UEs (e.g. the UEs form an independent Basic Service Set in IEEE 802.11). In a typical embodiment, a wireless device in a capillary network may act as the capillary network gateway to the network control apparatus.

In an embodiment, the wireless device is notified that no other devices of said synchronisation group are connected to a said control apparatus by receiving a notification transmitted by a said wireless control apparatus. This can be used by this first wireless device as a prompt to send a timing reference to the control apparatus, and to send and/or negotiate an extended discontinuous reception time period with the control apparatus.

In an embodiment, the timing reference is used by the wireless device to determine when the wireless device enters the idle state and powers up so as to take into account time periods when other wireless devices of the same synchronisation group connected to said control apparatus are powered up for at least one of transmission and reception. This has a number of possible applications, including for example enabling the wireless devices to avoid strictly simultaneous operation by staggering their extended DRX wake-up times, which helps to avoid or minimise interference or congestion. The wireless devices can coordinate this by for example local, device-to-device communication and/or via the control apparatus.

In an embodiment, the timing reference sent by the wireless device is a timestamp held by the wireless device. This has particular application in circumstances where the wireless device is (additionally) operating under a networking protocol that makes use of time stamps. A particular example is wireless local area networks, WLAN, including in particular IEEE (Institute of Electrical and Electronics Engineers) 802.11, though other sources of the timestamp are available, such as obtained via the Global Positioning System (GPS) if the wireless device is GPS-enabled.

In an embodiment, the wireless device receives an updated timing reference from a said wireless network. This allows the desired coordination between the wireless devices to be maintained, particularly given that internal clocks of the wireless devices may drift over time, and may drift significantly given the long time periods of extended DRX when the devices will be powered down.

In an embodiment, the wireless device is a gateway device for a capillary network of further devices which at least one of transmit data to and receive data from a wireless network via said wireless device. The concept of a capillary network is particularly pertinent for machine-to-machine (M2M) communications or machine-type communications (MTC).

According to a second aspect of the present invention, there is provided a processing system for a wireless device constructed and arranged to cause the wireless device: to send a synchronisation group identifier to a control apparatus of a wireless network, the synchronisation group identifier identifying a synchronisation group of wireless devices to which a said wireless device belongs; to transmit a timing reference to a said control apparatus and agree an extended discontinuous reception time period with a said control apparatus in the case that the wireless device is notified that no other devices of said synchronisation group are connected to a said control apparatus, said extended discontinuous reception time period being longer than an ordinary discontinuous reception time period used by the device during ordinary discontinuous reception; otherwise to receive a timing reference and an extended discontinuous reception time period from a said control apparatus in the case that other devices of said synchronisation group are already connected to a said control apparatus; to periodically enter an idle state and power up for reception in accordance with at least the timing reference and the extended discontinuous reception time period.

The processing system may comprise at least one processor and at least one memory including computer program code, the at least one memory and the computer program code being configured, with the at least one processor, to cause the wireless device at least to perform as described above.

According to a third aspect of the present invention, there is provided a method of operating plural base stations, the method comprising: operating plural base stations, which each provide wireless service for a plurality of wireless devices, so that each base station uses a common timing reference and a common extended discontinuous reception time period in controlling the operation of extended discontinuous reception by each wireless device of a synchronisation group of wireless devices which are serviced by the plural base stations.

In this aspect, the use of a common timing reference and extended discontinuous reception time period again enables good coordination of the activities of the wireless devices of a synchronisation group. One particular example of an application of this is in ensuring that a wireless device can in many cases receive a paging message when expected, even if the wireless device has moved service from one base station to another and despite the use of the extended discontinuous reception time period.

In an embodiment, the common timing reference for a synchronisation group of wireless devices is received from a first wireless device of said synchronisation group of wireless devices to connect to one of the base stations.

In an embodiment, the common timing reference is a timestamp held by a said first wireless device. As above, this has particular application in circumstances where the wireless device is (additionally) operating under a networking protocol that makes use of time stamps. A particular example is wireless local area networks, WLAN, including in particular IEEE (Institute of Electrical and Electronics Engineers) 802.11, though other sources of the timestamp are available, such as obtained via the Global Positioning System (GPS) if the wireless device is GPS-enabled.

In an embodiment, the common extended discontinuous reception time period for a synchronisation group of wireless devices is obtained by negotiation between one of the base stations and a first wireless device of said synchronisation group of wireless devices to connect to said one of the base stations.

In an embodiment, each base station transmits a paging message for reception by a wireless device during a paging window of the wireless device when the wireless device is not in discontinuous reception. In an example of this, this again facilitates reception of a paging message by the wireless device when expected, even if the wireless device has moved service from one base station to another and despite the use of the extended discontinuous reception time period. The paging messages are in practice typically transmitted simultaneously, or practically or substantially simultaneously or in close succession, by the base stations.

In an embodiment, the method comprises operating the plural base stations so that: each base station uses a first common timing reference and a first common extended discontinuous reception time period in controlling the operation of extended discontinuous reception by each wireless device of a first synchronisation group of wireless devices which are serviced by the plural base stations; and so that: each base station uses a second common timing reference and a second common extended discontinuous reception time period in controlling the operation of extended discontinuous reception by each wireless device of a second synchronisation group of wireless devices which are serviced by the plural base stations.

This allows different synchronisation groups of wireless devices to be controlled separately and independently, for example to help reduce interference and congestion, and to cater better to the individual requirements of the wireless devices of those different synchronisation groups.

According to a fourth aspect of the present invention, there is provided apparatus for controlling operation of plural base stations, the apparatus comprising: a processing system constructed and arranged to cause each of plural base stations, which each provide wireless service for a plurality of wireless devices, to use a common timing reference and a common extended discontinuous reception time period in controlling the operation of extended discontinuous reception by each wireless device of a synchronisation group of wireless devices which are serviced by the plural base stations.

The apparatus and/or processing system may be provided separately from (i.e. in addition to) the base stations, or may be part of a processing system provided in one or more of the base stations, or a combination of these.

There may also be provided a computer program comprising code such that when the computer program is executed on a computing device, the computing device is arranged to carry out any of the methods described above.

There may also be provided a non-transitory computer-readable storage medium comprising a set of computer-readable instructions stored thereon, which, when executed by a processing system, cause the processing system to carry out any of the methods described above.

Further features and advantages of the invention will become apparent from the following description of preferred embodiments of the invention, given by way of example only, which is made with reference to the accompanying drawings.

DETAILED DESCRIPTION

As mentioned above, for machine-type communications (MTC) in machine-to-machine (M2M) communications in particular, a long "extended" DRX time period has been proposed, largely to keep down the frequency of paging messages and other system signals being sent and therefore to keep down the general volume of network traffic, and also to keep down power consumption. The extended time period may be at least several minutes, but is typically an hour or several hours, or even 24 hours or even several days. As can be seen, the extended DRX time period is likely to be at least 1000 times longer than an ordinary DRX time period. For a specific example relevant to 3GPP, see the Technical Document contribution S2-112592 in 3GPP TSG SA (Technical Specification Groups Service and System Aspects).

Figure 1:
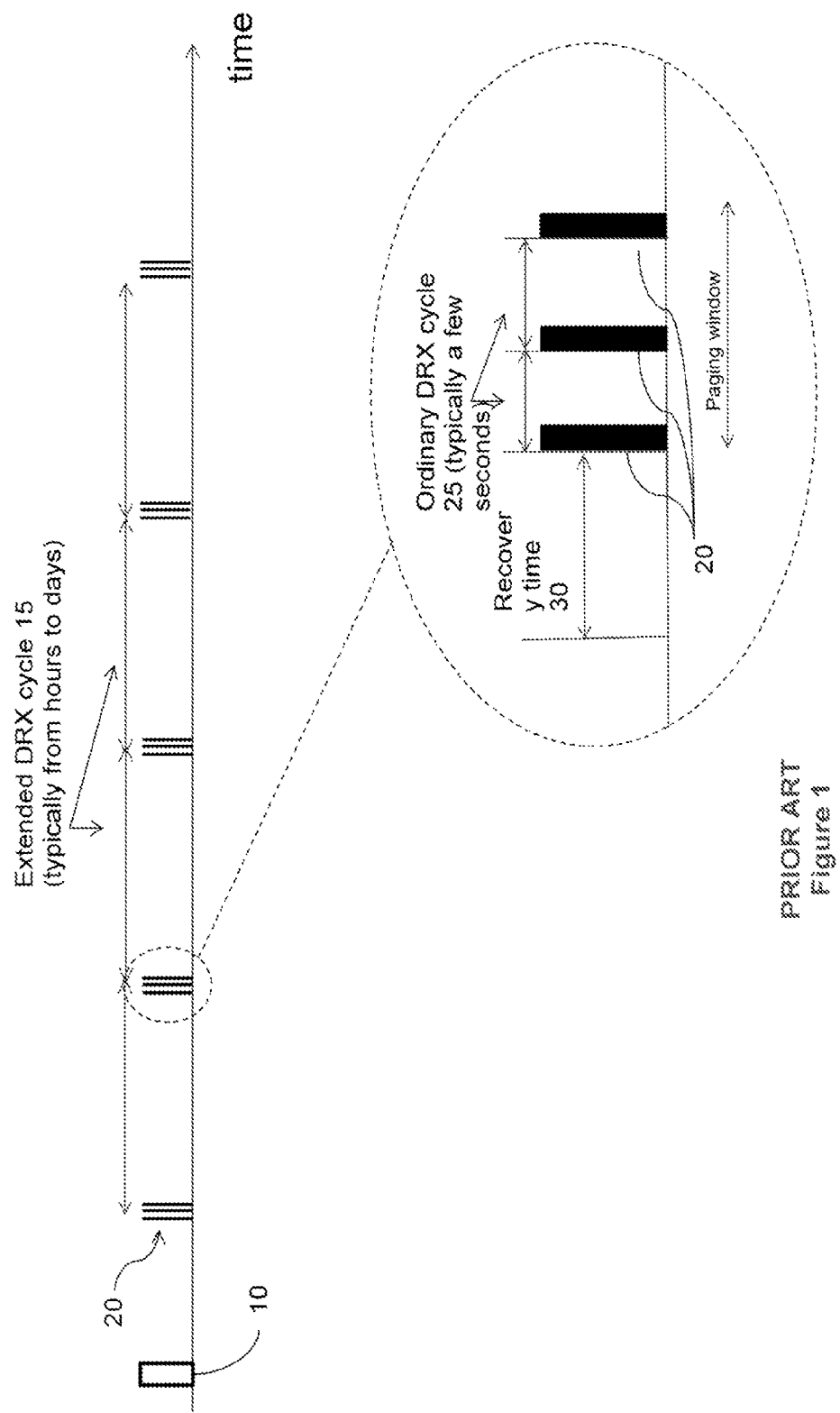
FIG. 1 shows a schematic timing diagram illustrating the use of extended DRX and plural paging messages.

This is shown schematically in FIG. 1. A wireless device 10 is switched on or otherwise first powers up to connect to a wireless network. The wireless device 10 is at least partially powered down (i.e. typically at least a receiver of the wireless device 10 is powered down) to save power during lengthy extended DRX sleep periods 15. The wireless device 10 periodically powers up so as to be able to receive paging messages 20 delivered over the wireless network. In the example shown, plural paging messages 20 (N=3 in the example shown) are transmitted in succession over the wireless network in a "paging window", which maximises the chance that the wireless device 10 will actually receive at least one of the paging messages. The wireless device 10 may use "ordinary" DRX to power down its receiver for the usual short time periods 25 of ordinary DRX in between the expected plural paging messages 20, as shown most clearly in the insert in FIG. 1. The wireless device 10 will typically also begin its powering up procedure some time 30 before the first paging message 20 is expected. A relatively lengthy recovery time 30 may be required given that the wireless device may have been substantially powered down to a very low power state given the long extended DRX periods 15, as well as providing for system information reception and neighbouring cell measurements (for cell reselection purposes).

Figure 2:
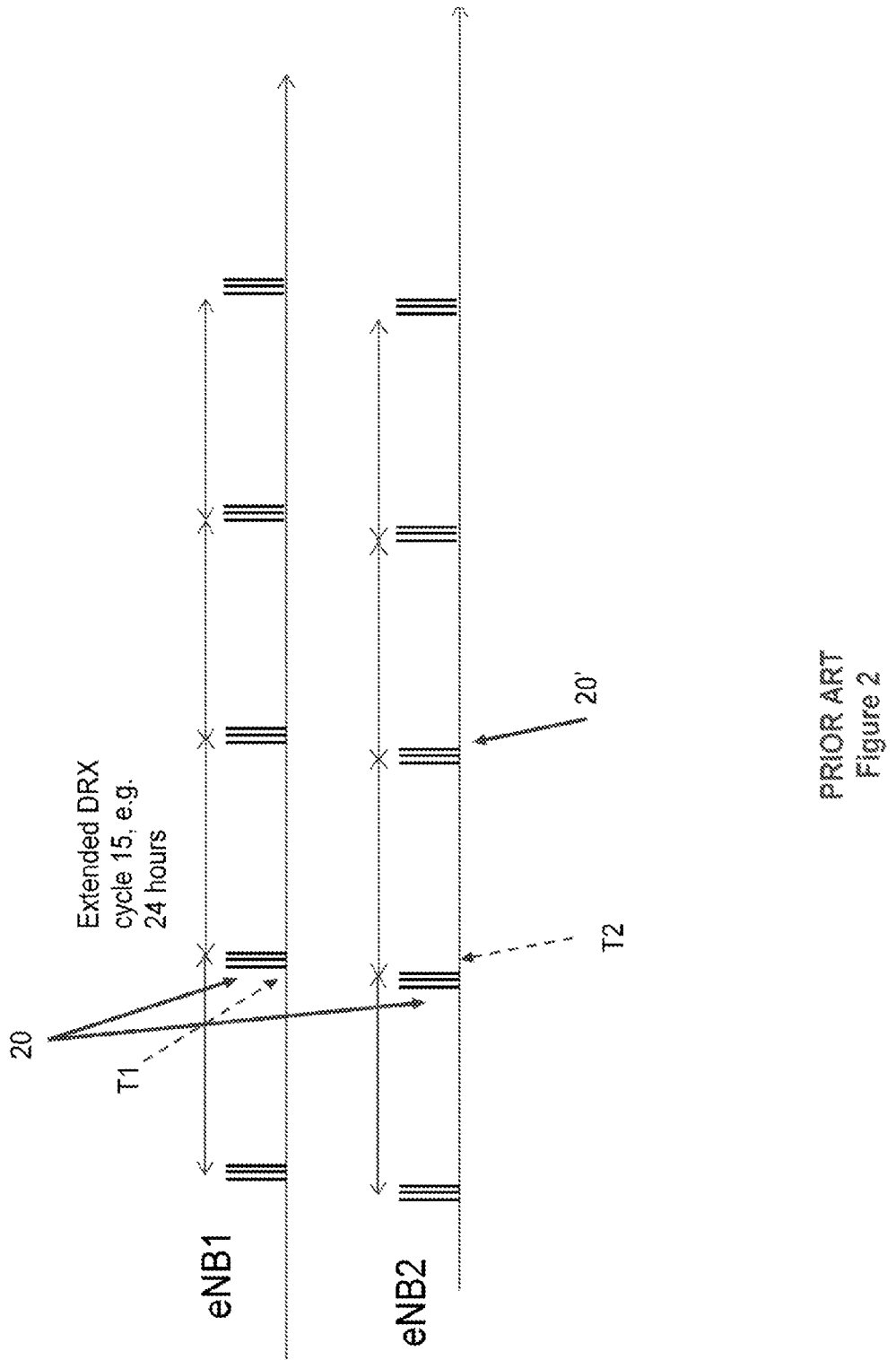
FIG. 2 shows a schematic timing diagram illustrating the use of extended DRX and plural paging messages by two base stations.

One particular problem of using an extended DRX period is illustrated schematically in FIG. 2. The wireless device 10 is first being serviced by a first base station eNB1. (The term "base station" is used in this specification to include a "traditional" base station, a Node B, an evolved Node B (eNB), or any other access point to a network, unless the context requires otherwise.) At a time T1, the wireless device 10 wakes up (expecting to receive paging messages 20), and notices that cell reselection to another base station eNB2 has to be made (for example because the wireless device 20 has moved or been moved in the meantime, or because the first base station eNB1 is not currently operating). The wireless device 10 therefore carries out a cell reselection process to move to the second base station eNB2, and in this case does so before the paging messages 20 are received from the first base station eNB1. However, by the time T2 when the wireless device 10 has moved service to the second base station eNB2, paging messages 20 sent by the second base station eNB2 have been missed and the device therefore has to wait a long time (in this case, practically the whole of the extended DRX period, which could be hours, or a day or more) until the next transmission 20' of paging messages by the second base station eNB2. This gives rise to long delays in the wireless device 10 being able to receive paging messages.

Another issue with machine-type communications (MTC) is that there can be very many wireless devices being serviced by one or more base stations in a particular geographical area. This can easily exacerbate problems of interference to communications to and from the wireless devices, as well as cause congestion problems due to the high levels of network traffic. Moreover, with machine-type communications (MTC), one particular wireless device may act as an access point or a gateway to a cellular network for a number of other devices which operate as a so-called capillary network. These other devices may be connected to the gateway wireless device (and optionally to each other) using a wired or a wireless network arrangement so that they can make use of the cellular network to which the gateway wireless device is connected for remote transmission and reception. In the case that these other devices are wireless devices connected wirelessly to the gateway device and/or to each other), yet further problems of interference and network congestion can arise.

To overcome one or more of these problems, various examples of embodiments of the present invention make use of what may be termed an absolute timing reference which can be used either for all wireless devices in a synchronisation group, or for all base stations/network control apparatus providing service for the wireless devices of a synchronisation group, or both. Similarly, various examples of embodiments of the present invention make use of what may be termed a common extended DRX period which can be used either for all wireless devices in a synchronisation group, or for all base stations/network control apparatus providing service for the wireless devices of a synchronisation group, or both. As will be understood from the following, the start times of the extended DRX periods and, similarly, the timing of transmission of paging messages may be varied between wireless devices and/or synchronisation groups to reduce the chances of interference and congestion.

The term synchronisation group as used herein refers to a group of wireless devices or user equipment (UEs) forming a capillary network or a plurality of capillary networks whose transmissions and receptions are coordinated, i.e. the wireless devices are transmitting and receiving in synchronisation with one another (though not necessarily simultaneously), according to some common, shared time basis. The wireless devices will typically be connected to the same network provider and may be in the same or in different network cells. In a typical embodiment, a wireless device in a capillary network may act as the capillary network gateway to the network control apparatus.

It will be understood that in general the "network control apparatus" is the overall apparatus that provides for general management and control of the network and connected devices. Such apparatus may in practice be constituted by several discrete pieces of equipment. As a particular example in the context of UMTS (Universal Mobile Telecommunications System), the network control apparatus may be constituted by for example a so-called Radio Network Controller operating in conjunction with one or more Node Bs (which, in many respects, can be regarded as "base stations"). As another example, UMTS LTE (Long Term Evolution) makes use of a so-called Evolved Node B (eNB) where the RF transceiver and resource management/control functions are combined into a single entity. In the present case, the network control apparatus may additionally or alternatively be or include a so-called Mobility Management Entity (MME) and/or a Machine-Type Communication Interworking Function (MTC IWF) or similar apparatus. Such terms are used broadly here to describe the control apparatus that is used to control the machine-type communications between the wireless devices operating using machine-to-machine (M2M) communications.

Figure 3:
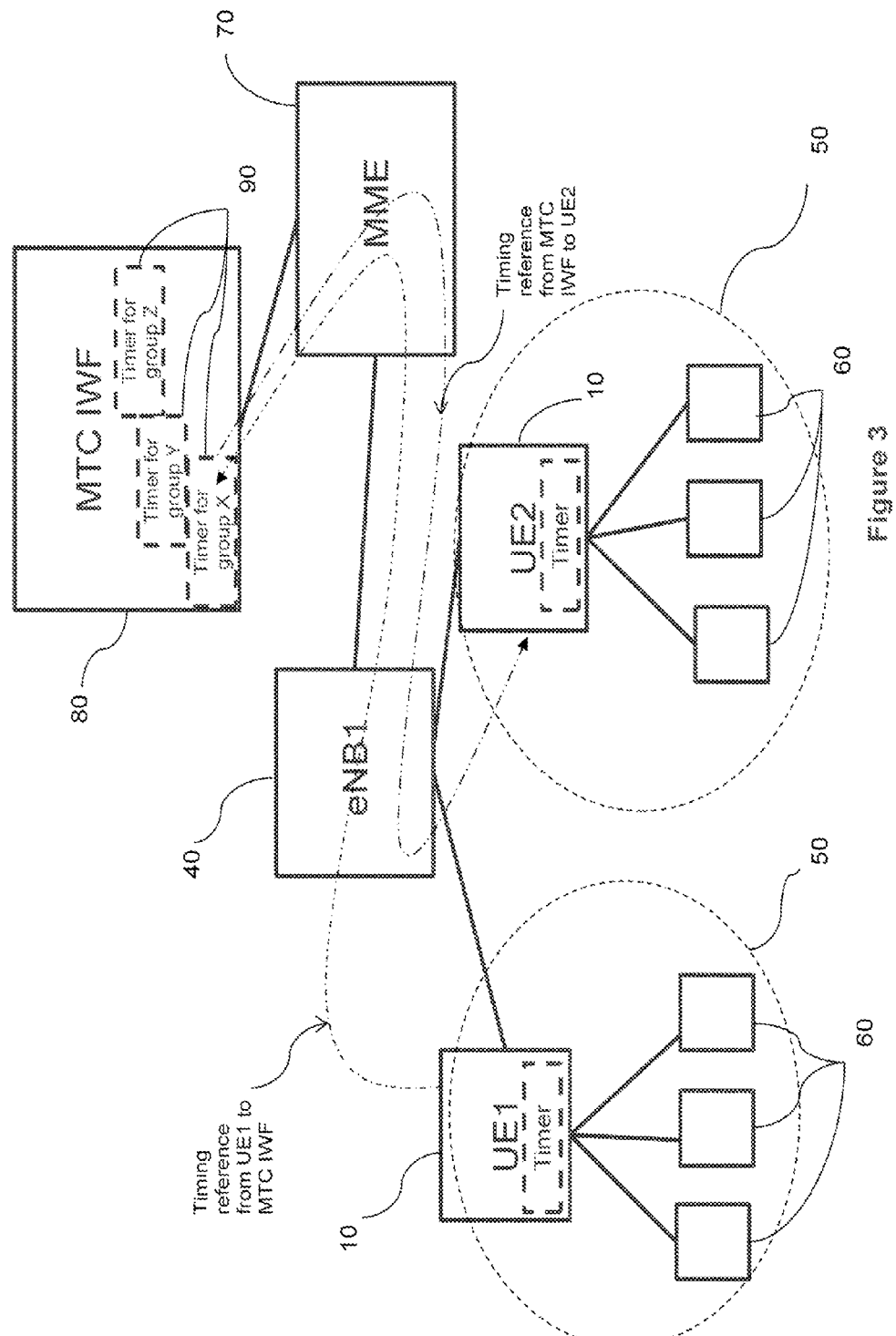
FIG. 3 shows schematically an example of wireless devices and a base station in accordance with an embodiment of the present invention.

Referring first to FIG. 3, a first wireless device UE1 10 and a second wireless device UE2 10 are both serviced by the same base station eNB1 40 (the first and second wireless devices 10 being representative of potentially many wireless devices being serviced by the base station 40). In this example, each wireless device 10 operates as a gateway device to the base station eNB1 40 for a respective capillary network 50 of further wireless devices 60. In this example, the wireless devices 10 operate using M2M communications and may be connected to the respective gateway wireless device UE1, UE2 10 (and optionally to each other) using a wired or a wireless network arrangement so that they can make use of the cellular network to which the gateway wireless device UE1, UE2 10 is connected for remote transmission and reception. As such, a so-called Mobility Management Entity (MME) 70 and a Machine-Type Communication Interworking Function (MTC IWF) 80 are provided to coordinate the activities of the various devices 10,60 and the base station 40, arranging for and controlling the sending of control signals, data, etc. As will be understood, however, for present purposes, these various control functions can be carried out by any appropriate control apparatus, typically implemented by suitably programmed computers, and the use of a MME 70 and MTC IWF 80 are given simply as examples.

Each wireless device UE1,UE2 10 is set to be part of the same synchronisation group so that so that operation of the wireless devices UE1,UE2 10 can be coordinated and synchronised. Each wireless device UE1,UE2 10 therefore operates using the same timing reference, and preferably also the same extended DRX time period (in addition to any ordinary DRX time period), as the basis for its own operation. As one particular example of this, the start time of the extended DRX cycle can be staggered slightly between the wireless devices UE1,UE2 10, i.e. an extended DRX cycle offset may be configured to stagger the paging windows. For example, extended DRX cycles for UE2 may be set, for example, so that UE2 paging windows are 1 minute after the paging windows of UE1 (and for the next UE, say UE3, 2 minutes after UE1 paging windows, etc., etc.). This allows the wireless devices to perform their operations roughly at the same time of the day, while avoiding exactly instantaneous operations, which could cause congestion in networks.

In this example, the timing reference is determined by the first wireless device UE1 10 of the synchronisation group that connects to the base station eNB1 40 sending a timing reference to the base station eNB1 40. A number of sources for the timing reference are available. It may be for example an absolute time obtained via the Global Positioning System (GPS) if the wireless device 10 is GPS-enabled. As another alternative, it may be a time stamp that is used in accordance with IEEE 802.11 in the case that the wireless device 10 is using an IEEE 802.11 WLAN to connect to the devices 60 of its capillary network 50. It may be based on some other internal clock of the device 10. As another example, it may be an absolute time obtained over the Internet.

That timing reference is then stored by the network control apparatus 70,80 (in this particular example, the MTC IWF 80), and sent by the network control apparatus 70,80 to all wireless devices UE2,UE3, etc. 10 that connect subsequently. Similarly, the first wireless device UE1 10 of the synchronisation group sends a proposed extended DRX time period to the network control apparatus 70,80, and negotiates a final extended DRX time period with the network control apparatus 70,80 as necessary. That final extended DRX time period is then sent to all wireless devices UE2,UE3, etc. 10 that connect subsequently by the network control apparatus 70,80. The network control apparatus 70,80 may store different timing references 90, and extended DRX time periods, for different synchronisation groups X,Y,Z that are serviced by the network.

The initial extended DRX time period proposed by the first wireless device UE1 10 may have been pre-programmed to the first wireless device UE1 10, based on for example the particular application(s) running on the first wireless device UE1 10. In combination with the timing reference, this allows the network control apparatus 70,80 to know when the first and other wireless devices UE1,UE2, etc. 10 are reachable. It is noted here that the extended DRX time period may be a single specific time value, or may be for example a multiplier of the ordinary DRX time period. As further examples, it may be a function of for example the timing reference timer value, or based on a more complex formula.

Figure 4:
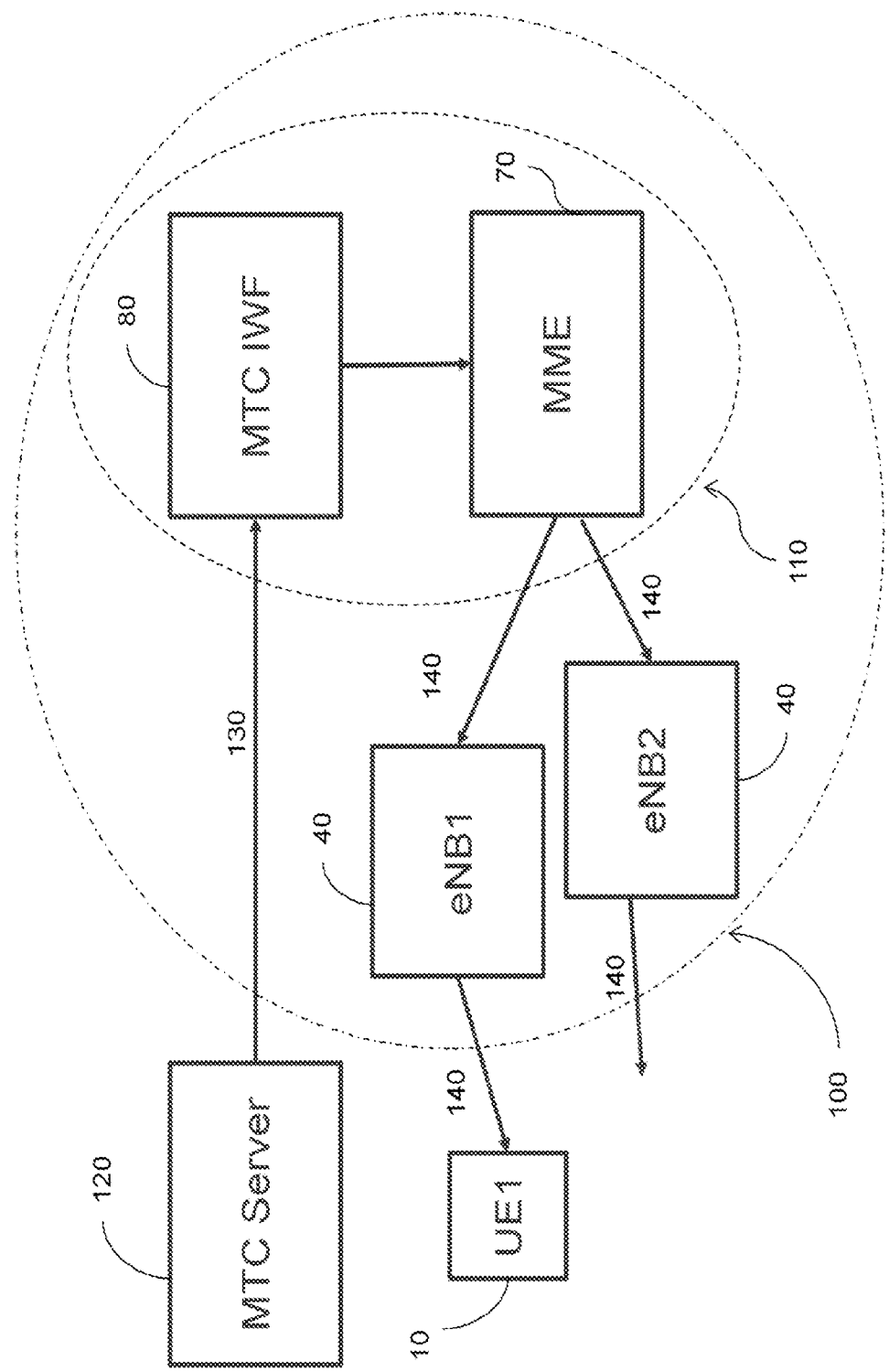
FIG. 4 shows schematically another example of wireless devices and a base station in accordance with an embodiment of the present invention.

Referring now to FIG. 4, in this example, two (or more) base stations eNB1, eNB2 40 are controlled by the same network control apparatus 70,80 to provide network coverage for a cellular network 100. In the example shown, the wireless device 10 again operates as a gateway device to the cellular network 100 for a respective capillary network of further wireless devices (not shown). Thus, for this example, the network control apparatus 70,80 is constituted by a MME 70 and MTC IWF 80, which can be regarded as providing a core network 110 of a cellular (3GPP) network and which connect to a MTC server 120. However, whilst the use of extended DRX has particular application in M2M communications, this example is not limited to that application.

In this example, the same timing reference and the same extended DRX time period is used for communications by each of the base stations 40 when communicating with the wireless devices UE1, etc., particularly when sending paging messages. Thus, for example, the MTC server 120 may send a request 130 to the MTC IWF 80 and MME 70 to trigger a wireless device UE1, for example in order to establish an IP (Internet Protocol) layer connection between the wireless device 10 and the MTC Server 120. As a result, a paging message 140 is sent by the MME 70 via the base stations 40 for receipt by the wireless device UE1. Because the base stations 40 all use the same timing reference and the same extended DRX time period, the paging message 140 is sent out at (practically or substantially) the same time by each base station 40 during the wireless device UE1 paging window when the wireless device UE1 is not in discontinuous reception. Referring to the discussion above in connection with FIG. 2, this means that if the wireless device 10 has relocated from one base station eNB1 to another eNB2 during its extended DRX "sleep" period for any reason, the wireless device 10 will still receive (or at least is very likely to receive) a paging message during the paging window at the expected time because of this synchronisation or coordination between the base stations 40, which make use of the common or absolute timing reference and extended DRX period.

Figure 5:
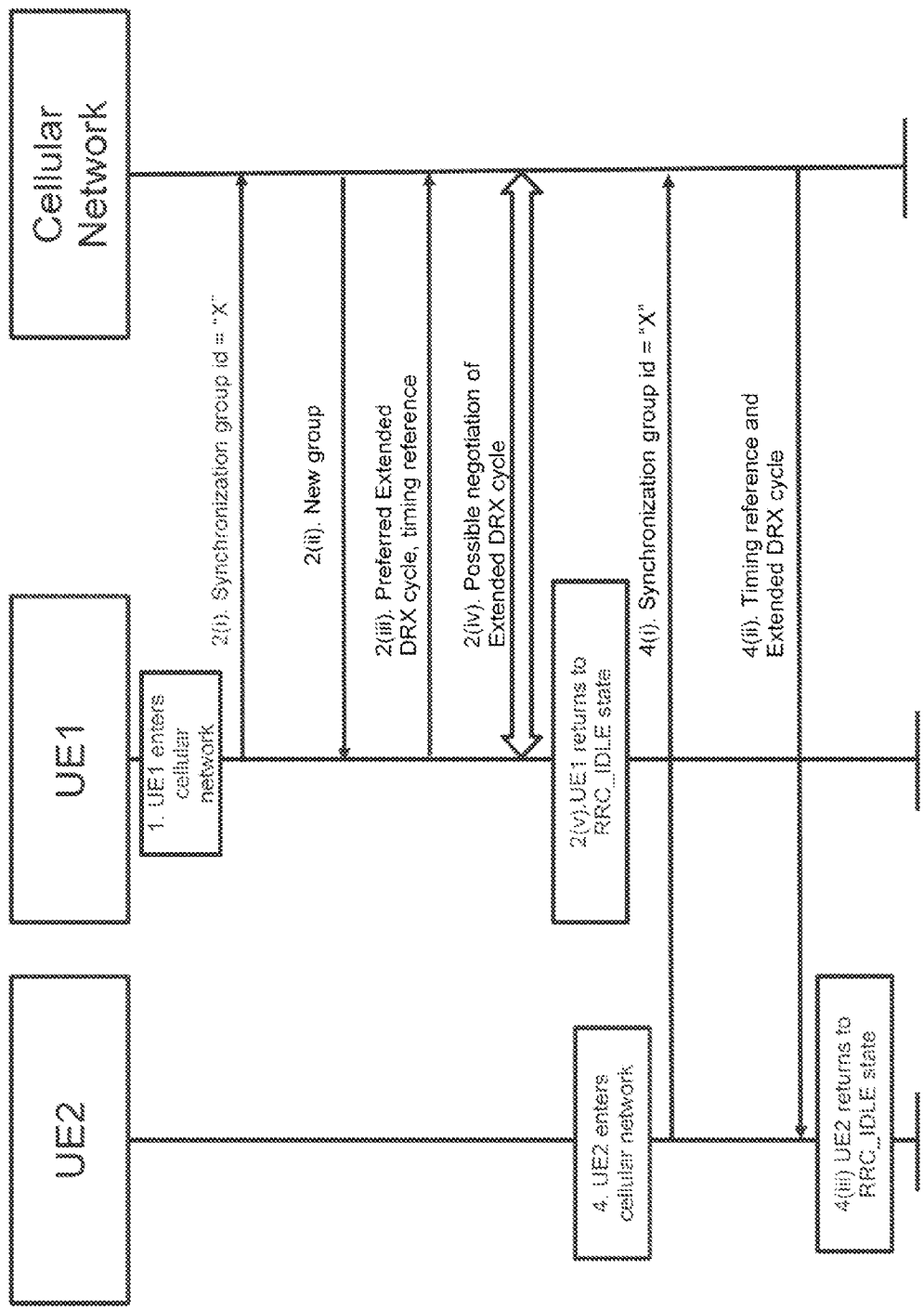
FIG. 5 shows schematically the main signalling steps involved in an example of connection of two wireless devices UE1,UE2 to a cellular network in accordance with an embodiment of the present invention.

A specific example of connection of two wireless devices UE1,UE2 to a cellular network will now be described with reference to FIG. 5, which shows schematically the main signalling steps involved.

1. UE1 enters the cellular network. For example, the power in the UE1 is switched on for the first time.

UE1 has an internal clock, which will be used as the timing reference in this example. As mentioned above, this timing reference may be obtained as a time stamp, or using GPS, or via the Internet, or some other sourer. UE1 also stores information identifying the synchronisation group to which it belongs. In this example, the identifier of the group is referred to as "X". UE1 also knows the preferred value of the Extended DRX cycle for the group. For example, as mentioned above, the value of the Extended DRX cycle may have been pre-programmed to the UE, based on for example the requirements of the particular application. As another example, the value of the Extended DRX cycle may be obtained from a control apparatus (such as an MTC server for example) or elsewhere, and/or updated based on application level negotiation between the control apparatus and UE1.

2. UE1 makes the initial attach to the cell, and performs the following steps during or immediately after the attach:

(i) The UE1 transmits a signal to inform the control apparatus that its synchronisation group id is "X".

(ii) Because UE1 is the first UE of this group, the control apparatus transmits a signal to inform UE1 that X is a new group. UE1 therefore knows that no Extended DRX cycle or Timing reference exist for the group.

(iii) The UE1 sends its preferred Extended DRX cycle and timing reference to the control apparatus.

(iv) The timing reference is delivered to the control apparatus, and the timer for group X is started in the control apparatus. The Extended DRX cycle value proposed by UE1 may not be accepted by the control apparatus. A negotiation between UE1 and the control apparatus may therefore be needed.

(v) After any negotiation is complete, an upper layer of UE1 configures the extended DRX cycle to allow monitoring of the extended paging message transmissions. UE1 stores the final Extended DRX cycle value, and enters an RRC_IDLE protocol state. The UE1 partially powers itself off and keeps only the real-time clock (RTC) running It may be noted that the UE is still in the RRC_IDLE protocol state as DRX operation applies, and not a full power-off or similar offline state.

3. At a predefined moment in time based on the upper layer DRX configuration (the time of the next paging window, minus the recovery time), UE1 powers or "wakes" up, performs the required neighbouring cell measurements, system information updates and possible cell reselection, and receives paging messages within the paging window.

4. When a new UE (UE2), which belongs to the same synchronisation group as UE1, enters the cellular network, it performs the following actions before it starts to receive paging messages. These steps can be performed for example during the initial attach:

(i) UE2 transmits a signal to inform the control apparatus that the synchronisation group id is "X".

(ii) The control apparatus notices that UE2 belongs to the same group as UE1 (because it shares the same "synchronisation group id" X), i.e. that the timing reference for UE2 already exists following some synchronisation procedure between UE1 and UE2 via the main cellular network or via some peer-to-peer transmission supported by both UEs (e.g. UE1 and UE2 form an independent Basic Service Set in IEEE 802.11). The control apparatus sends the timing reference (i.e. the current value of the timer of group X in the control apparatus) and the Extended DRX cycle to UE2. An extended DRX cycle offset may also be sent to UE2 to shift its paging window relative to that of UE1.

(iii) Next, UE2 stores the Extended DRX cycle and uses the timing reference as a timer initialisation value of its internal timer, and then enters an RRC_IDLE protocol state.

5. After returning to idle, UE2 performs similar operations as UE1 described above.

It may be noted that no additional negotiation was performed during this attach: the synchronisation group id (which is connected to the synchronisation rules for the group) and the associated timing reference and extended DRX cycle for the group and had already been stored in the control apparatus.

As noted above, when a wireless device is also a capillary network gateway device, and there are nearby capillary networks using the same frequency bands (a particular example being the 2.4 GHz Industrial, Scientific and Medical (ISM) band), the common timing reference, which was defined for paging purposes can be utilised to minimise the interference caused to and by the other capillary network. For example, if UE1 (the master UE) tells its regular activity times to UE2 (which is the gateway device of a nearby capillary network), UE2 could avoid traffic at those times. The transmission of activity times between UE1 and UE2 (and other similar devices) can be by any suitable technology, such as via the main cellular network or via some peer-to-peer transmission supported by both UEs (e.g. UE1 and UE2 form an independent Basic Service Set in IEEE 802.11). In the case that more than two capillary networks are to be synchronised, the decision as to when an individual capillary network can be active could be based on negotiation between the UE gateway device for that capillary network and the master UE (or the MTC Server).

As noted, a number of sources for the timing reference are possible. As one particular example in the case that the capillary networks are WLAN based, the timing reference may be set so that the wireless device 10 that acts as the MTC gateway device (i.e. as the WLAN access point or AP) of a capillary network uses the current value of its 8 byte IEEE 802.11 timestamp as the timing reference. In IEEE 802.11, the timestamp is included as a fixed field in the beacon frame broadcast by the AP in an infra-structure BSS or by a station probe response frame response in an independent BSS to allow synchronisation between stations in a BSS. This timestamp has an accuracy of 1 microsecond. Naturally, when the value is sent to a cellular network (to the MTC IWF 80 in the examples above), there are unpredictable delays, which may be in tens of milliseconds. Hence the timing reference value in the MTC IWF 80 cannot have the accuracy of the timer in the wireless device 10. However, in general, it is often sufficient that the timers in the wireless devices 10 and the MTC IWF timers are synchronised within an accuracy of say hundreds of milliseconds.

Figure 6:
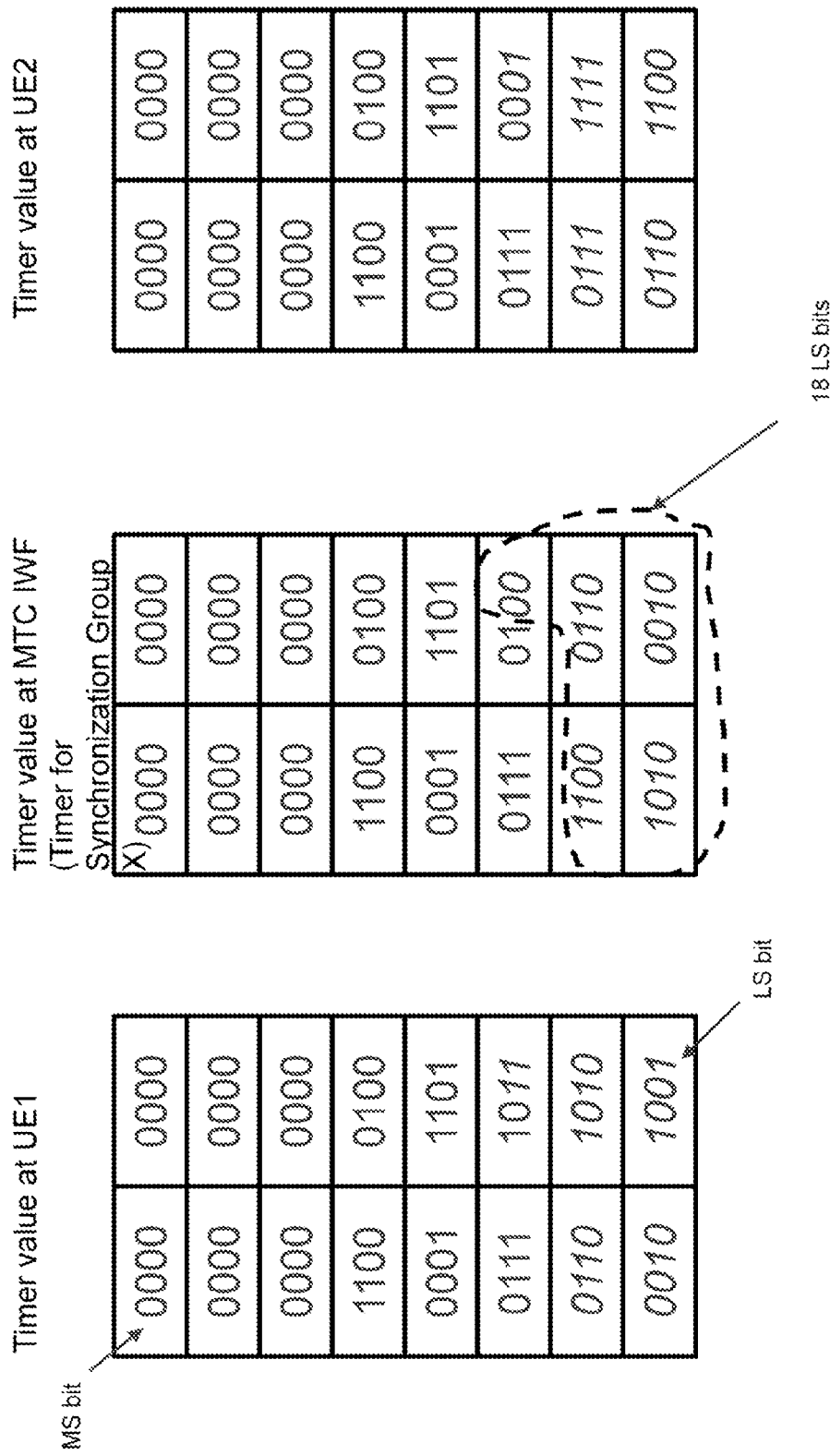
FIG. 6 shows schematically examples of timer values.

As a consequence, referring now to FIG. 6, it is not necessary to signal all 8 bytes of the IEEE 801.11 timestamp value 150. For example, some of the "least significant" bits, such as the 18 LS bits, can be omitted when the current timestamp used as the timing reference is sent to the network. As an additional optimisation, it is also possible to remove some of the "most significant" bits of the timestamp, which gives further savings in the signalling are required. It is noted that the IEEE 802.11 timer wrap-around is about 80,000 years, while a wrap-around time below one year would be sufficient for most if not all cellular MTC paging purposes.

The network may also refresh the timers in the wireless devices 10 from time to time, by sending a new timing reference to all the wireless devices 10 in the synchronization group. This may be necessary when the timing reference in those wireless devices 10 has drifted too much to maintain synchronization over long time periods. This may arise due to inaccuracy of the internal real time clock of the wireless devices 10, particularly as the wireless devices 10 are switched off for long times in accordance with extended DRX. By way of example, this updating can be done by including the timing reference for the wireless devices 10 in a paging message for the whole synchronisation group, for which a special "timing reference update" paging message may be used). No connection needs to be established for this operation by use of this paging technique.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

The above embodiments are to be understood as illustrative examples of the invention. Further embodiments of the invention are envisaged. For example, timestamps for wireless devices are used in other wireless protocols, including for example IEEE 802.15 (which, as a particular example, is used as a basis for the ZigBee (trade mark) standard). It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of operating a wireless device, the method comprising:
   a wireless device sending a synchronisation group identifier to a control apparatus of a wireless network, the synchronisation group identifier identifying a synchronisation group of wireless devices to which the wireless device belongs;
   if the wireless device is notified that no other devices of said synchronisation group are connected to the control apparatus, the wireless device transmitting a timing reference to the control apparatus and agreeing an extended discontinuous reception time period with the control apparatus, said extended discontinuous reception time period being longer than an ordinary discontinuous reception time period used by the device during ordinary discontinuous reception;
   else, the wireless device receiving a timing reference and an extended discontinuous reception time period from the control apparatus;
   the wireless device periodically entering an idle state and powering up for reception in accordance with at least the timing reference and the extended discontinuous reception time period.

2. A method according to claim 1, wherein the wireless device is notified that no other devices of said synchronisation group are connected to the control apparatus by receiving a notification transmitted by the control apparatus.

3. A method according to claim 1, wherein the timing reference is used by the wireless device to determine when the wireless device enters the idle state and powers up so as to take into account time periods when other wireless devices of the same synchronisation group connected to said control apparatus are powered up for at least one of transmission and reception.

4. A method according to any of claim 1, wherein the timing reference sent by the wireless device is a timestamp held by the wireless device.

5. A method according to claim 1, comprising the wireless device receiving an updated timing reference from the wireless network.

6. A method according to claim 1, wherein the wireless device is a gateway device for a capillary network of further devices which at least one of transmit data to and receive data from a wireless network via said wireless device.

7. A processing system for a wireless device comprising at least one processor and at least one memory device having computer program code, the at least one memory device and the computer program code being configured to, with the at least one processor, cause a wireless device that includes the processing system:
   to send a synchronisation group identifier to a control apparatus of a wireless network, the synchronisation group identifier identifying a synchronisation group of wireless devices to which the wireless device belongs;
   to transmit a timing reference to the control apparatus and agree an extended discontinuous reception time period with the control apparatus in the case that the wireless device is notified that no other devices of said synchronisation group are connected to the control apparatus, said extended discontinuous reception time period being longer than an ordinary discontinuous reception time period used by the device during ordinary discontinuous reception;
   otherwise to receive a timing reference and an extended discontinuous reception time period from the control apparatus in the case that other devices of said synchronisation group are already connected to the control apparatus;
   to periodically enter an idle state and power up for reception in accordance with at least the timing reference and the extended discontinuous reception time period.

8. A processing system according to claim 7, wherein the processing system is constructed and arranged such that the wireless device is notified that no other devices of said synchronisation group are connected to the control apparatus by receiving a notification transmitted by the control apparatus.

9. A processing system according to claim 7, wherein the processing system is constructed and arranged such that the timing reference is used to determine when the wireless device enters the idle state and powers up so as to take into account time periods when other wireless devices of the same synchronisation group connected to said control apparatus are powered up for at least one of transmission and reception.

10. A processing system according to claim 7, wherein the processing system is constructed and arranged such that the timing reference sent by the wireless device is a timestamp held by the wireless device.

11. A processing system according to claim 7, wherein the processing system is constructed and arranged such that the wireless device is adapted to receive an updated timing reference from the wireless network.

12. A processing system according to claim 7, wherein the processing system is constructed and arranged such that the wireless device is capable of operating as a gateway device for a capillary network of further devices which at least one of transmit data to and receive data from a wireless network via the wireless device.

13. Non-transitory computer readable media storing thereon a computer program which, when executed on a computing device, operates a wireless device, the computer program being arranged to:
   instruct a wireless device to send a synchronisation group identifier to a control apparatus of a wireless network, the synchronisation group identifier identifying a synchronisation group of wireless devices to which the wireless device belongs;
   if the wireless device is notified that no other devices of said synchronisation group are connected to the control apparatus, the wireless device being instructed to transmit a timing reference to the control apparatus and agreeing an extended discontinuous reception time period with the control apparatus, said extended discontinuous reception time period being longer than an ordinary discontinuous reception time period used by the device during ordinary discontinuous reception;
   else, the wireless device being instructed to receive a timing reference and an extended discontinuous reception time period from the control apparatus;
   and the wireless device being periodically instructed to enter an idle state and powering up for reception in accordance with at least the timing reference and the extended discontinuous reception time period.

* * * * *